US011950074B2

(12) United States Patent
Zhou et al.

(10) Patent No.: US 11,950,074 B2
(45) Date of Patent: Apr. 2, 2024

(54) SPEAKER

(71) Applicant: AAC Microtech (Changzhou) Co., Ltd., Changzhou (CN)

(72) Inventors: Keyong Zhou, Shenzhen (CN); Yuanxiang Mao, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 169 days.

(21) Appl. No.: 17/840,575

(22) Filed: Jun. 14, 2022

(65) Prior Publication Data

US 2023/0217178 A1 Jul. 6, 2023

(30) Foreign Application Priority Data

Dec. 30, 2021 (CN) ......................... 202123434696.3

(51) Int. Cl.
*H04R 9/02* (2006.01)

(52) U.S. Cl.
CPC .......... *H04R 9/025* (2013.01); *H04R 2400/11* (2013.01)

(58) Field of Classification Search
CPC .......... H04R 9/06; H04R 9/025; H04R 9/045; H04R 2400/07; H04R 2400/11; H04R 7/20; H04R 9/02; H04R 9/046; H04R 9/043; H04R 9/04; H04R 31/003; H04R 2307/201; H04R 2307/207; H04R 1/02; H04R 3/00; H04R 1/00; H04R 2209/027
USPC ......................... 381/412, 404, 395, 409, 191
See application file for complete search history.

(56) References Cited

U.S. PATENT DOCUMENTS

2020/0208621 A1* 7/2020 Liu ......................... H02M 7/48

* cited by examiner

*Primary Examiner* — Norman Yu
(74) *Attorney, Agent, or Firm* — W&G Law Group

(57) ABSTRACT

The present invention provides a speaker including: a frame, a vibration system and a magnetic circuit system. The vibration system includes a vibration diaphragm and a voice coil. The magnetic circuit system includes a magnetic part, and the voice coil is arranged around the magnetic part. The vibration system further includes an elastic plate with two branch elastic plates. The branch elastic plate includes a connection part, an extension part, an elastic arm and a fixed part. The surfaces of the connection part and the extension part facing the connection surface are recessed together to form a welding slot, and the lead wire is accommodated in the welding slot. The speaker provided by the present invention can not only effectively prevent the voice coil from swaying, but also reduce the number of parts to simplify the product structure.

10 Claims, 8 Drawing Sheets

SPEAKER

FIELD OF THE PRESENT DISCLOSURE

The invention relates to the technical field of electro-acoustic transducers, in particular to speaker.

DESCRIPTION OF RELATED ART

Vehicle-mounted speakers usually use traditional paper cone speakers. At present, in-vehicle speakers have put forward higher requirements for high sound quality, flexible layout, low power consumption and small vibration. However, the voice coil of the vehicle-mounted speaker in the related art is prone to sway.

Therefore, it is necessary to provide a new speaker to solve the above problems.

SUMMARY OF THE PRESENT INVENTION

The purpose of the present invention is to provide a speaker that can not only effectively prevent the voice coil from swaying, but also reduce the number of parts to simplify the product structure.

Accordingly, the present invention provides a speaker, comprising: a frame, a vibration system supported by the frame, and a magnetic circuit system having a magnetic part surrounded by the voice coil. The vibration system includes a vibration diaphragm fixed on the frame and a voice coil for driving the vibration diaphragm. The voice coil has a connection surface perpendicular to a vibration direction of the vibration diaphragm and two lead wires extending from the connection surface;

The vibration system further includes an elastic plate having two branch elastic plates corresponding to the lead wires; the branch elastic plate includes a connection part fixed on the connection surface, an extension part, an elastic arm and a fixed part which are formed by extending from the connection part in sequence.

The fixed part is fixed on the frame and is electrically connected with an external circuit; surfaces of the connection part and the extension part facing the connection surface are concave together for forming a welding slot, and the lead wire is accommodated in the welding slot and electrically connected to the extension part.

In addition, the voice coil includes a main body disposed around the magnetic part and connected to the vibration diaphragm, and a protruding part extending from a side of the main body away from the magnetic part; the connection surface is located on the protruding part, such that a height difference between the two end surfaces of the main body along the vibration direction of the vibration diaphragm and the connection surface is formed; the connection part abuts against the main body.

In addition, the elastic arm includes a first elastic arm and a second elastic arm respectively extending from two opposite sides of the extension part; the fixed part includes a first fixed part extended from the first elastic arm and a second fixed part extended from the second elastic arm, and the first fixed part is electrically connected to the external circuit.

In addition, the first fixed part and the second fixed part are provided with fixed holes throughout; the frame is provided with a fixed column passing through the fixed hole.

In addition, the speaker further includes an electrical connector injection-molded with the frame, wherein one end of the electrical connector is electrically connected to the first fixed part, and another end of the electrical connector is electrically connected to the external circuit.

In addition, the magnetic circuit system further includes a magnetic bowl having a bottom plate and a magnetic frame fixed on the bottom plate; the magnetic part is fixed on the bottom plate and is spaced apart from the magnetic frame for forming a magnetic gap; the voice coil is inserted into the magnetic gap; a notch for avoiding the extension part is formed on the magnetic frame.

In addition, the frame includes a bottom wall and a surrounding wall extending from the bottom wall; the bottom wall and the surrounding wall are enclosed to form a containment hole; the containment hole penetrates the bottom wall, the magnetic bowl is accommodated in the containment hole, and the bottom plate is located on the plane where the bottom wall is located; a gap for avoiding the extension part is formed in the surrounding wall.

In addition, the magnetic part includes a first magnet fixed on the bottom plate, a first pole plate stacked on the side of the first magnet away from the bottom plate, and the second magnet is stacked on the side of the first pole plate away from the first magnet; the first magnet and the second magnet are set relatively at a same level.

In addition, the speaker includes two voice coils, two magnetic circuit systems and two elastic plates.

In addition, an axis of the magnetic part and the axis of the magnetic frame are both parallel to the vibration direction of the vibration diaphragm, and the connection part is arranged with a circular arc shape.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

Figure 1:
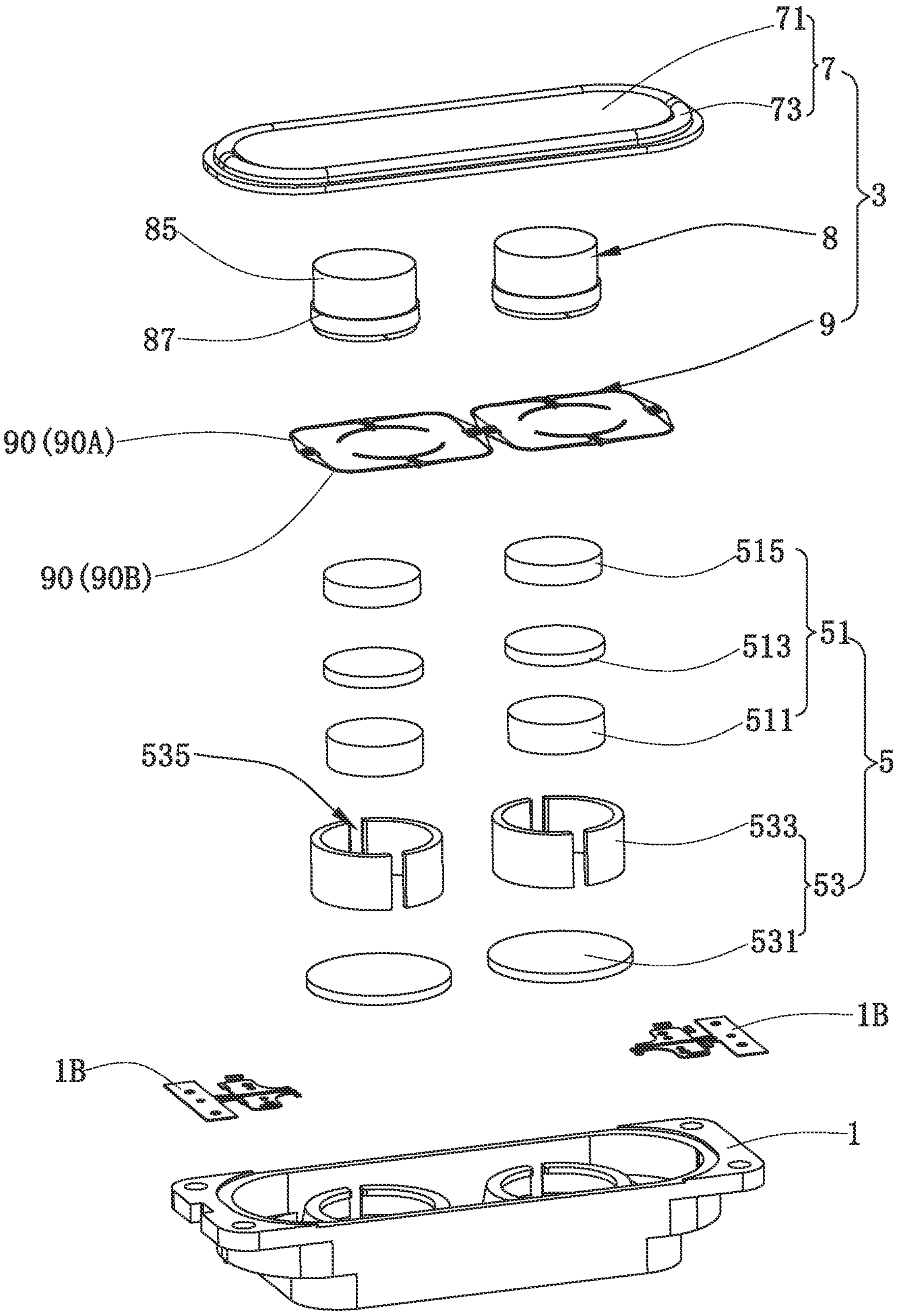
FIG. 1 is an exploded view of a speaker provided by an embodiment of the present invention.
Figure 2:
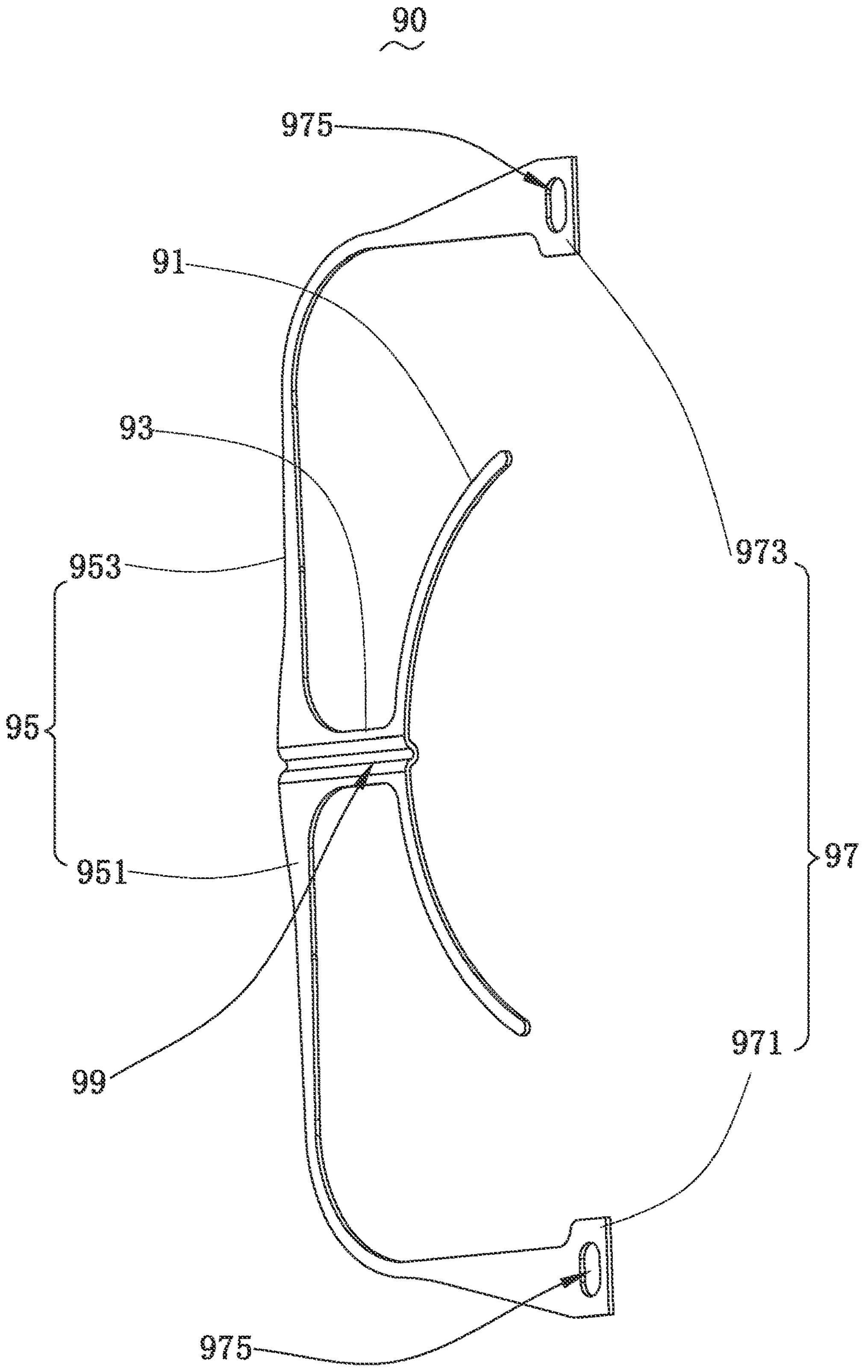
FIG. 2 is an isometric view of a branch elastic plate in the speaker shown in FIG. 1.
Figure 3:
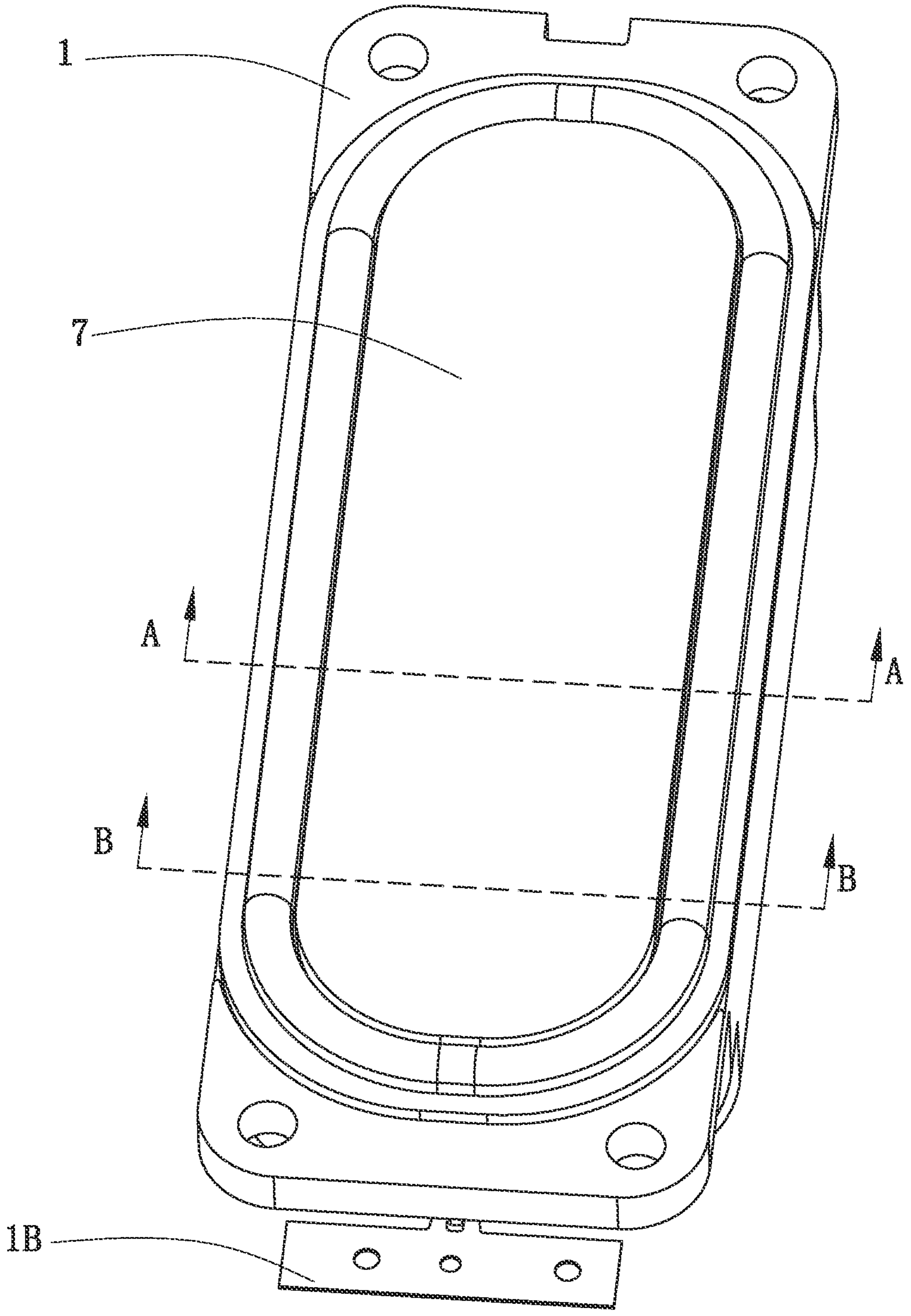
FIG. 3 is an isometric and assembled view of the speaker shown in FIG. 1.

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

As shown in FIGS. 1-8, a speaker in accordance with an embodiment of the present invention includes a frame 1, a vibration system 3 and a magnetic circuit system 5 respectively fixed on the frame 1, and the magnetic circuit system 5 is used to drive the vibration system 3 to vibrate and sound.

The magnetic circuit system 5 includes the magnetic part 51.

The system 3 includes a vibration diaphragm 7 fixed on the frame 1, a vibration coil 8 that drives the vibration diaphragm 7 to vibrate and sound, and an elastic plate 9, the voice coil 8 is arranged around the magnetic part 51.

voice coil 8 is arranged with a connection surface 81 perpendicular to the vibration direction of the vibration diaphragm 7 and two lead wires 83 drawn from the connection surface 81. The two lead wires 83 are the first lead wire 83A and the second lead wire 83B respectively. One of the first lead wire 83A and the second lead wire 83B is the incoming end of the voice coil 8, and the other is the outgoing end of the voice coil 8.

The elastic plate 9 includes two branch elastic plate 90 with conductive function, and the branch elastic plate 90 and the lead wire 83 are arranged in one-to-one correspondence.

Specifically, the two branch elastic plates 90 are respectively a first branch elastic plate 90A and a second branch elastic plate 90B, the first branch elastic plate 90A is set corresponding to the first lead wire 83A, and the second branch elastic plate 90B is set corresponding to the second lead wire 83B.

The material for making the branch elastic plate 90 includes, but is not limited to, one of stainless steel, copper, printed circuit board (Printed Circuit Board, PCB), and flexible circuit board (Flexible Printed Circuit, FPC).

The branch elastic plate 90 includes a connection part 91 fixed on the connection surface 81, and an extension part 93, an elastic arm 95 and a fixed part 97 extending from the connection part 91 in sequence. The fixed part 97 is fixed to the frame 1 and is electrically connected to the external circuit. The surfaces of the connection part 91 and the extension part 93 facing the connection surface 81 are recessed together to form a welding slot 99. The lead wire 83 is accommodated in the welding slot 99 and is electrically connected to the extension part 93.

Specifically, the first lead wire 83A is accommodated in the welding slot 99 of the first branch elastic plate 90A and is electrically connected to the extension part 93 of the first branch elastic plate 90A. The second lead wire 83B is accommodated in the welding slot 99 of the second branch elastic plate 90B and is electrically connected to the extension part 93 of the second branch elastic plate 90B.

Wherein, after the external circuit energizes the voice coil 8 through the elastic plate 9, the voice coil 8 vibrates under the action of the magnetic field of the magnetic part 51. At the same time, the vibration of the voice coil 8 will drive the vibration of the vibration diaphragm 7 to vibrate and drive the elastic plate 9 to vibrate in the vibration direction of the vibration diaphragm 7. And during the vibration of the voice coil 8, the elastic plate 9 and the vibration diaphragm 7 can restrain the movement of the voice coil 8 in the vibration direction perpendicular to the vibration diaphragm 7, thereby preventing the voice coil 8 from swaying. Thus, the vibration system can be guaranteed to run smoothly to improve product stability.

It should be noted that the lead wire 83 and the extension part 93 can be fixed and electrically connected by spot welding or soldering or solder paste connection or conductive adhesive bonding. this way, the automation of the fixed and electrical connection between the lead wire 83 and the extension part 93 can be realized, which is beneficial to the automatic assembly of the speaker.

Figure 4:
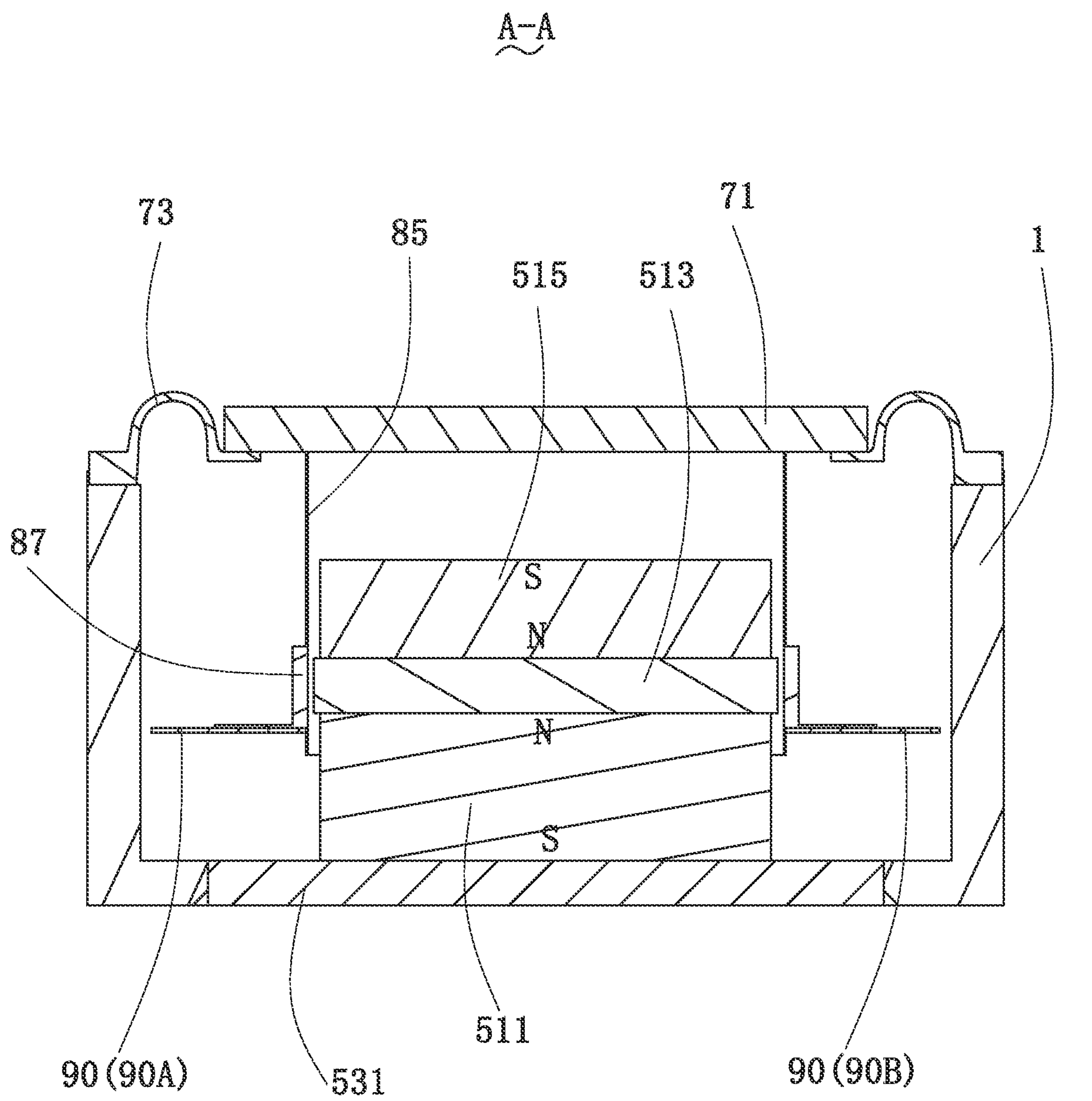
FIG. 4 is a cross-sectional view of the speaker taken along line AA in FIG. 3.
Figure 6:
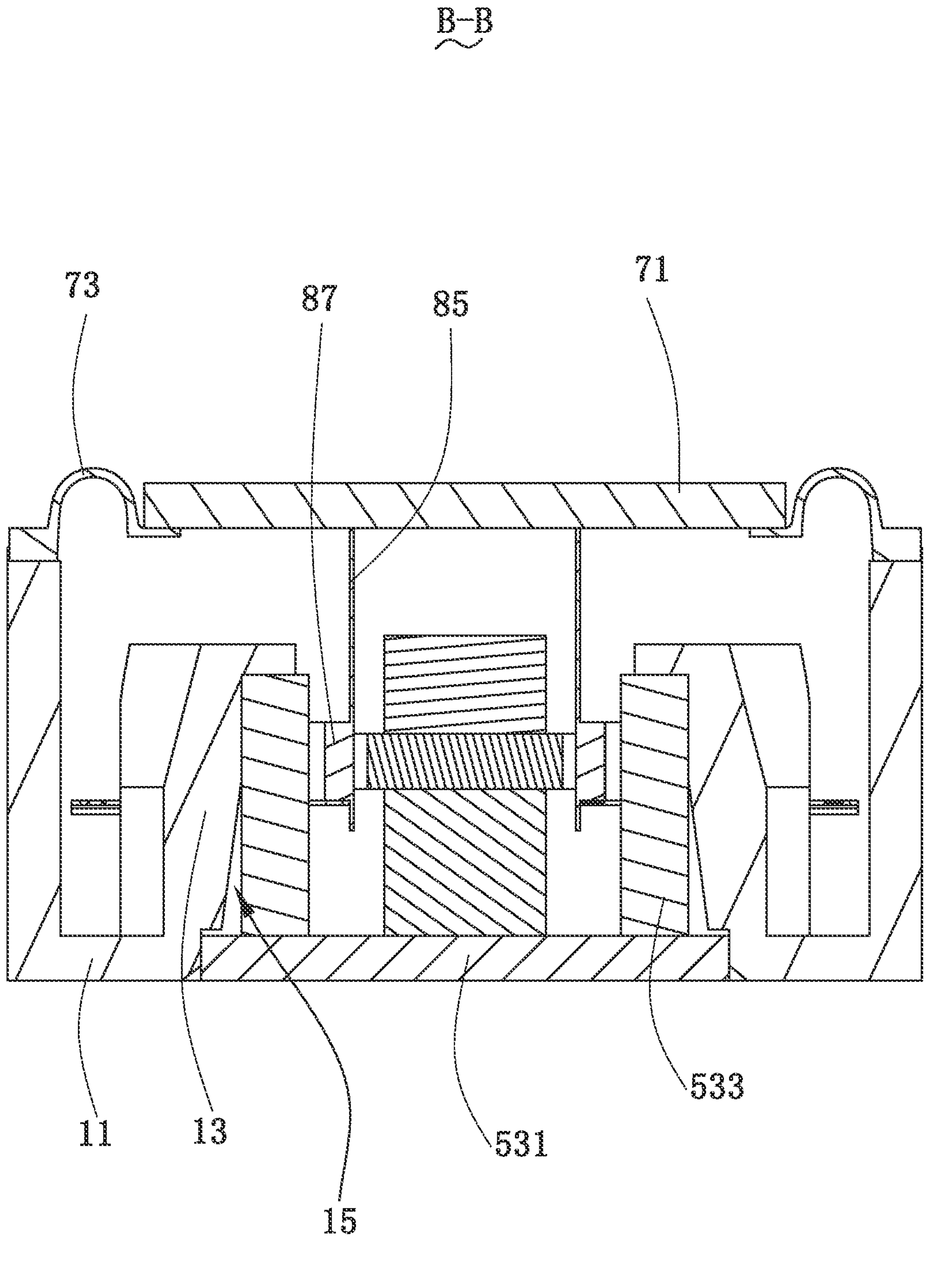
FIG. 6 is a cross-sectional view of the speaker taken along line BB in FIG. 3.
Figure 7:
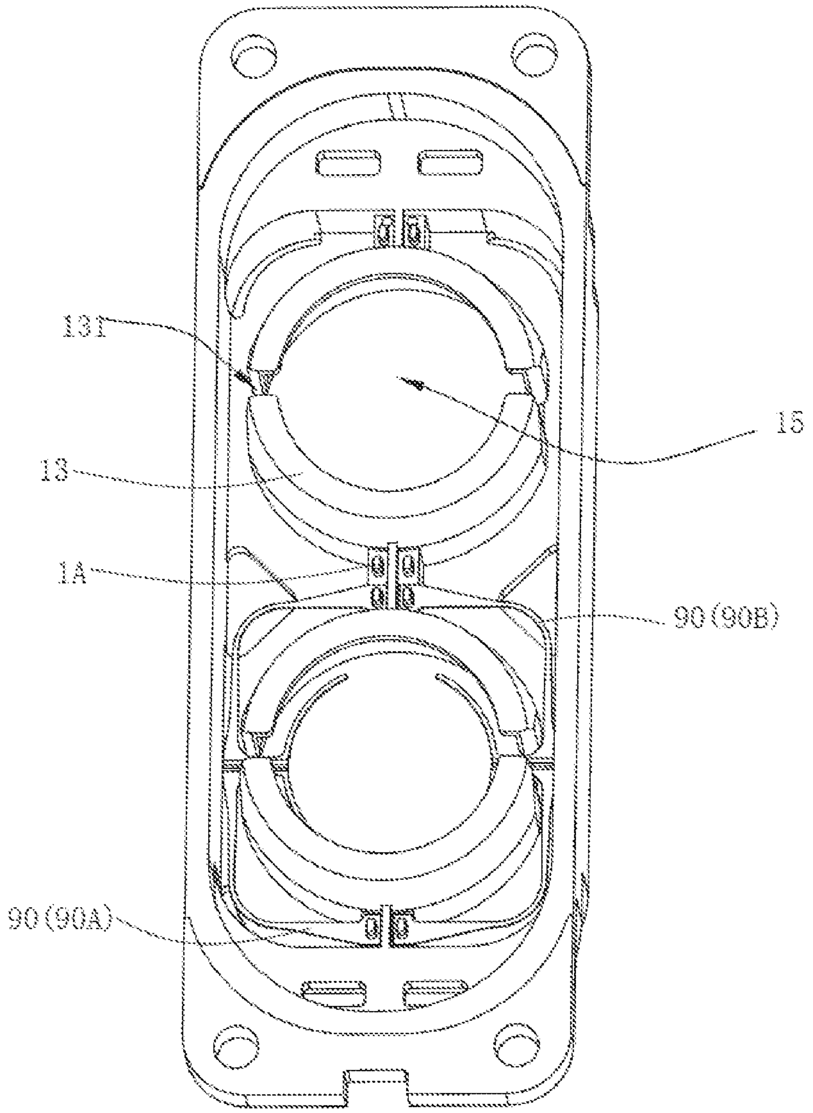
FIG. 7 illustrates an assembly of a frame and the elastic plate in the speaker.
Figure 8:
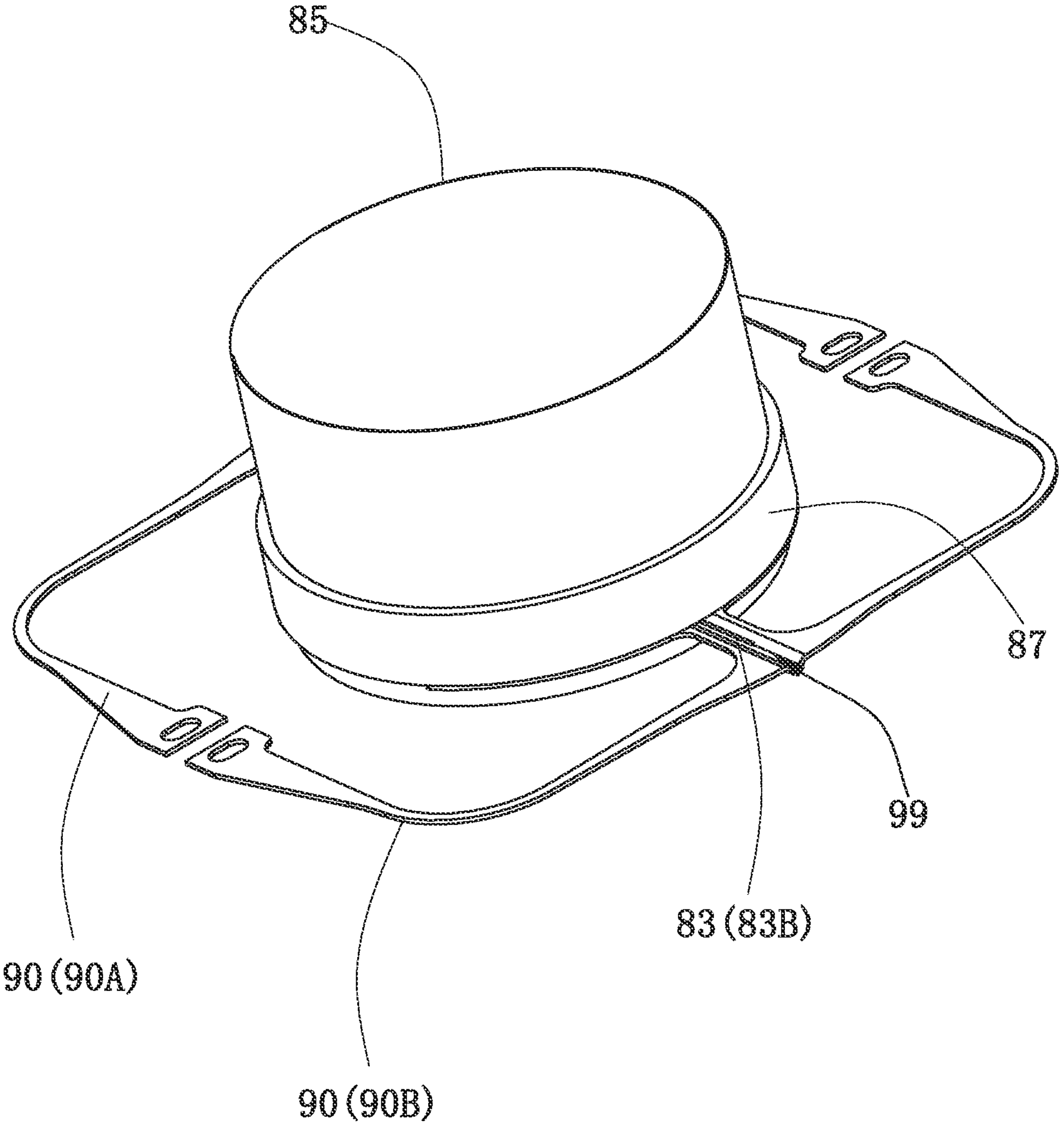
FIG. 8 illustrates an assembly of the voice coil and the elastic plate in the speaker.

As shown in FIG. 1, FIG. 4 and FIG. 6, the vibration diaphragm 7 includes a dome 71 and a membrane 73 arranged around the dome 71. the outer peripheral edge of the membrane 73 is fixed to the frame 1, the inner peripheral edge of the membrane 73 is fixed to the dome 71, and the voice coil 8 is connected to the dome 71.

It can be understood that, in other embodiments, the voice coil 8 is connected to the membrane 73, or the voice coil 8 and the vibration diaphragm 7 are connected through a skeleton.

In this embodiment, the voice coil 8 includes a main body 85 disposed around the magnetic part 51 and connected to the vibration diaphragm 7, and a protruding part 87 extending from the side of the main body 85 away from the magnetic part 51. The connection surface 81 is located on the protruding part 87, and there is a height difference between the two end surfaces of the main body 85 along the vibration direction of the vibration diaphragm 7 and the connection surface 81, and the connection part 91 also abuts the main body 85. The connection surface 81 is located on the protruding part 87, and the two end surfaces of the main body 85 along the vibration direction of the vibration diaphragm 7 have a height difference between the connection surface 81 and the connection surface 81.

Therefore, by connecting the connection part 91 of the elastic plate 9 to the connection surface 81 of the voice coil 8, the thick bottom of the speaker can be reduced, which is beneficial to the miniaturization of the speaker. At the same time, since the connection surface 81 is located on the protruding part 87, the connection part 91 can also be in contact with the main body 85 to avoid the problem of disconnection of the elastic plate 9 and the voice coil 8 caused by the force perpendicular to the vibration direction of the voice coil 8.

Figure 5:
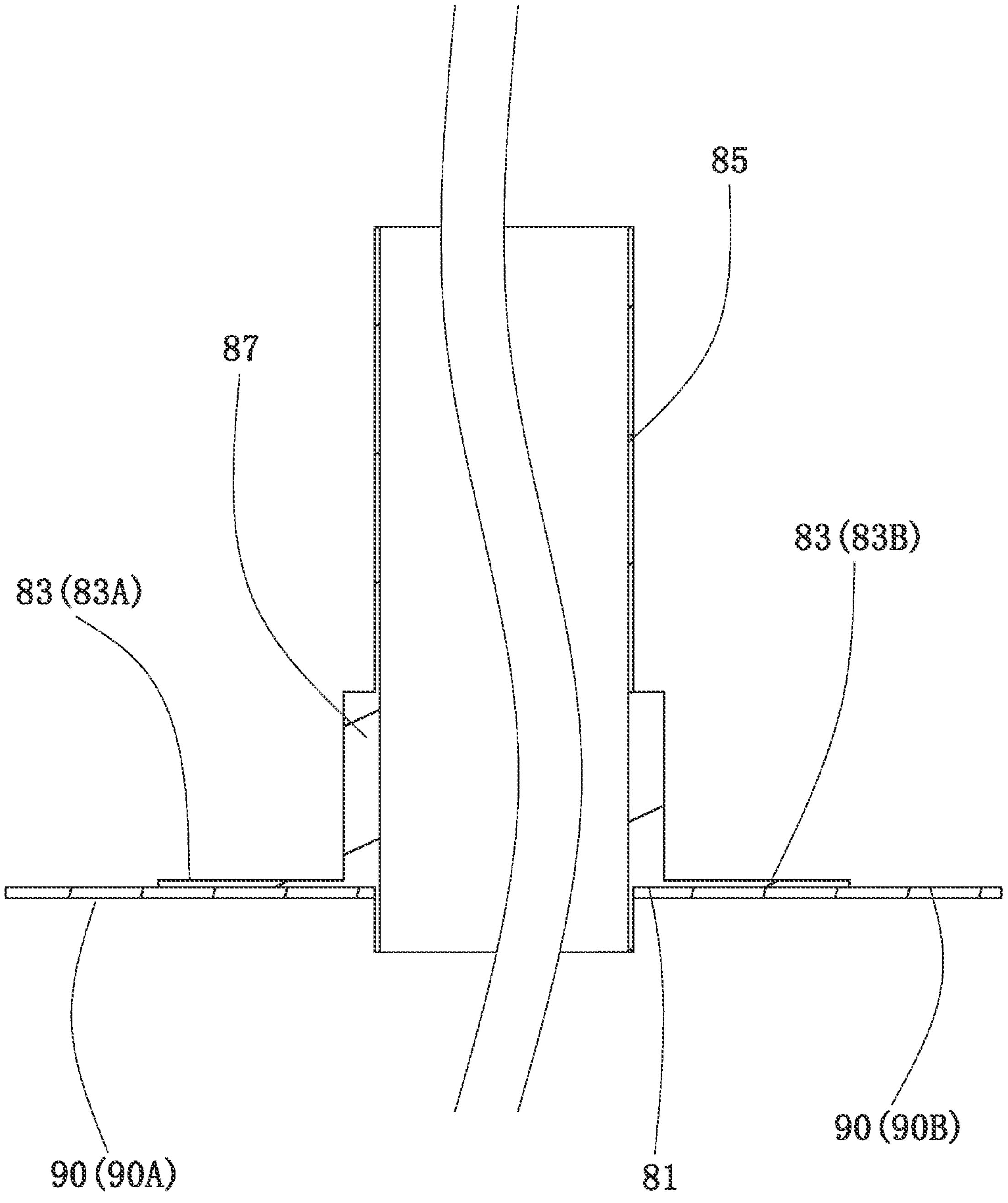
FIG. 5 illustrates a voice coil and an elastic plate of the speaker shown in FIG. 4.

As shown in FIG. 5, the connection surface 81 is the surface of the protruding part 87 on the side away from the vibration diaphragm 7. It can be understood that, in other embodiments, the connection surface 81 can also be the surface of the protruding part 87 facing the vibration diaphragm 7 side.

In this embodiment, the elastic arm 95 includes a first elastic arm 951 and a second elastic arm 953 respectively extending from two opposite sides of the extension part 93. The fixed part 97 includes a first fixed part 971 extending from the first elastic arm 951 and a second fixed part 973 extending from the second elastic arm 953, the first fixed part 971 is electrically connected to the external circuit. In this way, the first fixed part 971 of the first branch elastic plate 90A and the first fixed part 971 of the second branch elastic plate 90B can be arranged on the same side of the magnetic circuit system 5, so that the elastic plate 9 is electrically connected to the external circuit.

In this embodiment, both the first fixed part 971 and the second fixed part 973 are provided with a fixed hole 975, and the frame 1 is provided with a fixed column 1A which runs through the fixed hole 975.

In this embodiment, an electrical connector 1B is injected on the frame 1. One end of the electrical connector 1B is electrically connected to the first fixed part 971, and the other end is electrically connected to the external circuit.

In this embodiment, the magnetic circuit system 5 also includes a magnetic bowl 53 fixed on the frame 1. The magnetic bowl 53 includes a bottom plate 531 and a magnetic frame 533 fixed on the bottom plate 531, the magnetic part 51 is fixed on the bottom plate 531 and is spaced apart from the magnetic frame 533 to form a magnetic gap 5A, the voice coil 8 is inserted into the magnetic gap 5A, the magnetic frame 533 is formed with a notch 535 which avoids the extension part 93.

The bottom plate 531 and the magnetic frame 533 are both made of magnetically conductive material, so that the magnetic flux in the magnetic gap 5A can be enhanced.

As shown in FIG. 1 and FIG. 6, the bottom plate 531 and the magnetic frame 533 are two independent parts, and the notch 535 divides the magnetic frame 533 into two independent parts. It can be understood that, in other embodiments, the bottom plate 531 and the magnetic frame 533 can also be integrated structures.

In this embodiment, the magnetic part 51 includes a first magnet 511 fixed on the bottom plate 531, a pole plate 513 stacked on the side of the first magnet 511 away from the bottom plate 531, and a second magnet 515 stacked on the side of the pole plate 513 away from the first magnet 511. The first magnet 511 and the second magnet 515 are set relative to the same level. The pole plate 513 is made of magnetic conductive material, and the magnetic fields provided by the first magnet 511 and the second magnet 515 form a closed magnetic field through the action of the pole plate 513, the magnetic frame 533 and the bottom plate 531.

It should be noted that the relative settings of the first magnet 511 and second magnet 515 at the same level refer to: The polarity of the first magnet 511 near the pole plate 513 is the same as that of the second magnet 515 near the pole plate 513. As shown in FIG. 4, the end of the first magnet 511 close to the pole plate 513 and the end of the second magnet 515 close to the pole plate 513 are both N poles.

It should also be noted that the first magnet 511 and the second magnet 515 may be natural magnets or artificial magnets (e.g., magnet).

In this embodiment, the frame 1 includes a bottom wall 11 and a surrounding wall 13 extending from the bottom wall 11. The bottom wall 11 and the surrounding wall 13 are enclosed to form a containment hole 15, the containment hole 15 penetrates the bottom wall 11, and the magnetic bowl 53 is accommodated in the containment hole 15. And the bottom plate 531 is located on the plane where the bottom wall 11 is located, and a gap 131 that avoids the extension part 93 is formed on the surrounding wall 13. By accommodating the magnetic bowl 53 in the containment hole 15 and the bottom plate 531 being located on the plane where the bottom wall 11 is located, the thick bottom of the speaker can be reduced, thereby facilitating the miniaturization of the speaker.

In this embodiment, two voice coils 8, magnetic circuit system 5 and elastic plate 9 are provided. In this way, the two voice coils 8 are driven by the two magnetic circuit systems 5 to drive the vibration diaphragm 7 to vibrate, which can provide higher magnetic field efficiency, thereby improving the sound performance of the speaker.

In this embodiment, the magnetic part 51 and the magnetic frame 533 are both circular, and the axis of the magnetic part 51 and the axis of the magnetic frame 533 are both parallel to the vibration direction of the vibration diaphragm 7, and the connection part 91 is in a circular arc shape.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker, comprising:

a frame;

a vibration system supported by the frame, including a vibration diaphragm fixed on the frame and a voice coil for driving the vibration diaphragm, the voice coil having a connection surface perpendicular to a vibration direction of the vibration diaphragm and two lead wires extending from the connection surface;

a magnetic circuit system fixed on the frame, including a magnetic part surrounded by the voice coil; wherein the vibration system further includes an elastic plate having two branch elastic plates corresponding to the lead wires; the branch elastic plate includes a connection part fixed on the connection surface, an extension part, an elastic arm and a fixed part which are formed by extending from the connection part in sequence; and wherein the fixed part is fixed on the frame and is electrically connected with an external circuit; surfaces of the connection part and the extension part facing the connection surface are concave together for forming a welding slot, and the lead wire is accommodated in the welding slot and electrically connected to the extension part.

2. The speaker as described in claim 1, wherein the voice coil includes a main body disposed around the magnetic part and connected to the vibration diaphragm, and a protruding part extending from a side of the main body away from the magnetic part; the connection surface is located on the protruding part, such that a height difference between the two end surfaces of the main body along the vibration direction of the vibration diaphragm and the connection surface is formed; the connection part abuts against the main body.

3. The speaker as described in claim 1, wherein the elastic arm includes a first elastic arm and a second elastic arm respectively extending from two opposite sides of the extension part; the fixed part includes a first fixed part extended from the first elastic arm and a second fixed part extended from the second elastic arm, and the first fixed part is electrically connected to the external circuit.

4. The speaker as described in claim 3, wherein the first fixed part and the second fixed part are provided with fixed holes throughout; the frame is provided with a fixed column passing through the fixed hole.

5. The speaker as described in claim 3 including an electrical connector injection-molded with the frame, wherein one end of the electrical connector is electrically connected to the first fixed part, and another end of the electrical connector is electrically connected to the external circuit.

6. The speaker as described in claim 1, wherein the magnetic circuit system further includes a magnetic bowl having a bottom plate and a magnetic frame fixed on the bottom plate; the magnetic part is fixed on the bottom plate and is spaced apart from the magnetic frame for forming a magnetic gap; the voice coil is inserted into the magnetic gap; a notch for avoiding the extension part is formed on the magnetic frame.

7. The speaker as described in claim 6, wherein the frame includes a bottom wall and a surrounding wall extending from the bottom wall; the bottom wall and the surrounding wall are enclosed to form a containment hole; the containment hole penetrates the bottom wall, the magnetic bowl is accommodated in the containment hole, and the bottom plate is located on the plane where the bottom wall is located; a gap for avoiding the extension part is formed in the surrounding wall.

8. The speaker as described in claim 6, wherein the magnetic part includes a first magnet fixed on the bottom plate, a first pole plate stacked on the side of the first magnet away from the bottom plate, and the second magnet is stacked on the side of the first pole plate away from the first magnet; the first magnet and the second magnet are set relatively at a same level.

9. The speaker as described in claim 1 including two voice coils, two magnetic circuit systems and two elastic plates.

10. The speaker as described in claim 1, wherein an axis of the magnetic part and the axis of the magnetic frame are both parallel to the vibration direction of the vibration diaphragm, and the connection part is arranged with a circular arc shape.

* * * * *